(12) United States Patent
Miller et al.

(10) Patent No.: US 12,484,496 B2
(45) Date of Patent: Dec. 2, 2025

(54) MECHANIZED IRRIGATION MACHINE WITH ACTIVE PEST DETERRENTS

(71) Applicant: Lindsay Corporation, Omaha, NE (US)

(72) Inventors: Mark William Miller, Omaha, NE (US); Daniel L.P. Elliott, Omaha, NE (US)

(73) Assignee: LINDSAY CORPORATION, Omaha, NE (US)

( * ) Notice: Subject to any disclaimer, the term of this patent is extended or adjusted under 35 U.S.C. 154(b) by 360 days.

(21) Appl. No.: 18/310,774

(22) Filed: May 2, 2023

(65) Prior Publication Data

US 2024/0365728 A1 Nov. 7, 2024

(51) Int. Cl.
*A01G 25/09* (2006.01)
*A01G 25/16* (2006.01)
*A01M 29/10* (2011.01)
*A01M 29/20* (2011.01)

(52) U.S. Cl.
CPC ......... *A01G 25/092* (2013.01); *A01G 25/165* (2013.01); *A01M 29/10* (2013.01); *A01M 29/20* (2013.01)

(58) Field of Classification Search
CPC ... A01G 25/092; A01G 25/165; A01M 29/10; A01M 29/20; A01M 29/16
See application file for complete search history.

(56) References Cited

U.S. PATENT DOCUMENTS

| | | | |
|---|---|---|---|
| 5,048,755 A | 9/1991 | Dodds | |
| 5,268,971 A | 12/1993 | Nilsson et al. | |
| 5,539,851 A | 7/1996 | Taylor et al. | |
| 5,544,270 A | 8/1996 | Clark et al. | |
| 5,917,977 A | 6/1999 | Barrett | |
| 6,049,647 A | 4/2000 | Register et al. | |
| 2002/0030066 A1 * | 3/2002 | McKenna | B05B 12/06 222/630 |
| 2002/0107582 A1 | 8/2002 | Pollak et al. | |

(Continued)

FOREIGN PATENT DOCUMENTS

| | | | | |
|---|---|---|---|---|
| FR | 2820947 A1 * | 8/2002 | ............ | A01G 25/16 |
| KR | 20220080276 A | 6/2014 | | |
| WO | WO-2018096542 A1 * | 5/2018 | ............ | A01M 1/226 |

OTHER PUBLICATIONS

International Search Report and Written Opinion in related PCT Application PCT/US2024/026942 mailed Aug. 28, 2024, 12 pages.

*Primary Examiner* — Chad G Erdman
(74) *Attorney, Agent, or Firm* — HOVEY WILLIAMS LLP (57) ABSTRACT

A mobile irrigation system comprising a control system and an active pest deterrent system. The control system includes a data transfer module for transmitting communication signals over an external network and a first internal network communication element for transmitting communication signals over an internal mobile irrigation system network. The active pest deterrent system includes a pest deterrent device configured to deter pests from remaining in the field, the pest deterrent device including a controller configured to activate the pest deterrent device and a second internal network communication element communicatively coupling the controller to the control system via the internal mobile irrigation system network.

19 Claims, 2 Drawing Sheets

(56) References Cited

U.S. PATENT DOCUMENTS

| | | |
|---|---|---|
| 2006/0204531 A1 | 9/2006 | Squire et al. |
| 2019/0037786 A1 | 2/2019 | Fischman |
| 2022/0104441 A1 | 4/2022 | Charling et al. |
| 2022/0264869 A1 | 8/2022 | Grosscup |
| 2022/0338429 A1* | 10/2022 | Roth .................... A01G 25/167 |

* cited by examiner

FIG. 1

MECHANIZED IRRIGATION MACHINE WITH ACTIVE PEST DETERRENTS

BACKGROUND

Agricultural irrigation systems sometimes include or are used in conjunction with pest deterrents to protect field crops. Unfortunately, conventional pest deterrents are passive and thus have reduced effectiveness as pests become acclimated to them. Furthermore, it is impractical to change or update conventional pest deterrents to adapt to changing pest threats.

SUMMARY

Embodiments of the present invention solve the above-mentioned problems and other problems and provide a distinct advancement in the art of agricultural pest deterrents. More particularly, the invention provides a mobile irrigation system that provides active pest deterrence and integrated, remotely accessible pest deterrent control.

An embodiment of the mobile irrigation system broadly comprises a fixed central pivot, a number of spans, a conduit, an external network-connected control system, a power source for powering the mobile irrigation system, and an active pest deterrent system that can be remotely controlled, changed, and updated via the external network connection. Although a center pivot irrigation system is described, lateral move irrigation systems and stationary irrigation systems may also be utilized.

The fixed central pivot supports an innermost span. The central pivot has access to a well, water tank, or other source of water and may also be coupled with a tank or other source of agricultural products to inject fertilizers, pesticides and/or other chemicals into the water for application during irrigation.

Each span includes a truss section and a mobile tower. The spans are pivotably connected end-to-end from the central pivot.

Each truss section includes a number of beams rigidly connected to one another to form a framework which carries or otherwise supports the conduit. The truss sections are suspended above the ground between the mobile towers.

The mobile towers are positioned at outward ends of the spans and each includes at least two wheels, at least one of which is driven by a drive motor. The drive motor may be an electric motor, such as an alternating current (AC) motor or a direct current (DC) motor, and may drive the wheel or wheels directly or through a drive shaft in order to propel the mobile towers forward or backward.

The conduit carries water along the length of the spans. The conduit may include one or more valves which control the flow of water through the conduit into fluid distribution mechanisms in fluid communication with the conduit.

The control system includes a controller, a user interface, a data transfer module, a first internal network communication element, and a memory. The controller may comprise one or more processing units, microprocessors (single-core or multi-core), microcontrollers, digital signal processors (DSPs), field-programmable gate arrays (FPGAs), analog and/or digital application-specific integrated circuits (ASICs), or the like, or combinations thereof.

The data transfer module generally allows the control system, and the active pest deterrent system indirectly, to communicate with, transfer data (including agricultural data) to, and download software updates, programming, and direct commands from a remote server, remote or mobile computing device (such as one utilized by a remote user to access the user interface), cloud service, or other external system, and/or each other via an external wireless communication network such as a machine to machine (M2M) network, an edge network, a LAN, a WAN, or the like.

The first internal network communication element communicates with the controllers of the pest deterrent devices described below over an internal mobile irrigation system network. The internal mobile irrigation system network may be a LAN, a wireless mesh, or the like. The internal mobile irrigation system network may utilize a VPN and may utilize the same networking hardware as the external wireless communication network. The first internal network communication element may be a radio antenna, Wi-Fi antenna, or the like in the case of a wireless network.

The power source provides electrical power to the motors, the control system, and/or the active pest deterrent system. The power source may be an electrical charging system connected to the grid or an independent wind or solar powered unit.

The active pest deterrent system comprises a number of pest deterrent devices for deterring pests from entering or remaining in the field, a number of sensors for detecting the presence of pests, and a secondary power source for providing backup power.

Each pest deterrent device includes a controller and may include a second internal network communication element for communicating with the control system. The pest deterrent devices may be mounted at various points on the mobile irrigation system and in the field near or remote from the mobile irrigation system. Each pest deterrent device may be centrally controlled via the control system or may be an independently controlled node or even completely independent from the other pest deterrent devices. The active pest deterrent system may also use its own network independent of the internal network of the mobile irrigation system.

The second internal network communication element communicates with the controller of the control system over the internal mobile irrigation system network via the first internal network communication element. The second internal network communication element may be a radio antenna, Wi-Fi antenna, or the like in the case of a wireless network.

Each of the pest deterrent devices may be laser, a noise cannon, an animal distress call sound generator, an ultrasonic noise generator, a subsonic noise generator, a strobe light, or any other suitable pest deterrent device. The pest deterrent devices may include at least two of the above pest deterrent devices for diversified pest deterrent.

The sensors detect the presence of a pest and may be mounted at various points on the mobile irrigation system. For example, some of the sensors are mounted near or integrated with some of the pest deterrent devices and other sensors are mounted or positioned remotely from the pest deterrent devices either on the mobile irrigation system or in the field in the vicinity of the mobile irrigation system. In other embodiments, remote sensors such as satellite imaging systems that can provide sub-meter satellite imagery may be used to detect the presence of a pest.

The secondary power source provides electrical power to components of the active pest deterrent system when electrical power is not available or needed from the power source. The secondary power source may be a battery, a power scavenging device, or a power harvesting device such as a solar panel or a wind turbine.

In use, the active pest deterrent system deters pests according to a pest deterrent scheme, which may be active independent of movement or irrigation of the mobile irrigation system or may be dependent upon a movement or irrigation scheme of the mobile irrigation system. The pest deterrent devices themselves may be activated upon receiving a signal from one of the sensors indicating the presence of a pest.

The pest deterrent devices can be programmed for changes, adjustments, and/or updates to the pest deterrent scheme. Changes or adjustments may be made to various aspects of pest deterrent schemes such as laser patterns, noise cannon trajectory, projected noise pattern, deterrent timing, volume, delays, bird distress calls, and the like. For example, distress calls of different birds may be used as different birds enter the field or as different migrations are active. Such programming can be achieved remotely via the external network.

Pest deterrent schemes, patterns of pest deterrent schemes, and other parameters may include changes or be changed to keep pests reactive to the deterrent. For example, a changing pest deterrent scheme may re-trigger a fight or flight response from a pest. It also facilitates a single pest deterrent device being effective against different pests or types of pests.

Changes, adjustments, and/or updates may be stored locally on the control system and pushed to the pest deterrent devices over the internal mobile irrigation system network, stored in the cloud and pushed to the pest deterrent devices through the external network and the internal mobile irrigation system network, defined by a remote user and pushed to the pest deterrent devices through the external network and the internal mobile irrigation system network, and/or defined by a local user and pushed to the pest deterrent devices via the internal mobile irrigation system network.

The above-described mobile irrigation system and active pest deterrent system provide several advantages in addition to the advantages described above. For example, the pest deterrent devices may be programmed for changes, adjustments, and/or updates to the pest deterrent scheme. Changes or adjustments may be made to various aspects of pest deterrent schemes. Such programming can be achieved remotely via the external network. Pest deterrent schemes, patterns of pest deterrent schemes, and other parameters may include changes or be changed to keep pests reactive to the deterrent. The active pest deterrent system provides pest protection to the field and crops irrigated by the mobile irrigation system. The active pest deterrent system may also provide pest protection to the mobile irrigation system itself and to other equipment in the field.

Furthermore, at least some of the pest deterrent devices may be mounted well above the crops, such as on the trusses or mobile towers to deploy the deterrent without having to add additional structures to the field. This also allows crops to be harvested without having to remove the pest deterrent devices from the field. The pest active pest deterrent system may be particularly useful for high value-added crops such as sweet corn, seed corn, potatoes, sugar beets, mint, sunflowers, and other crops.

BRIEF DESCRIPTION OF THE DRAWING FIGURES

Embodiments of the current invention are described in detail below with reference to the attached drawing figures, wherein.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Figure 1:
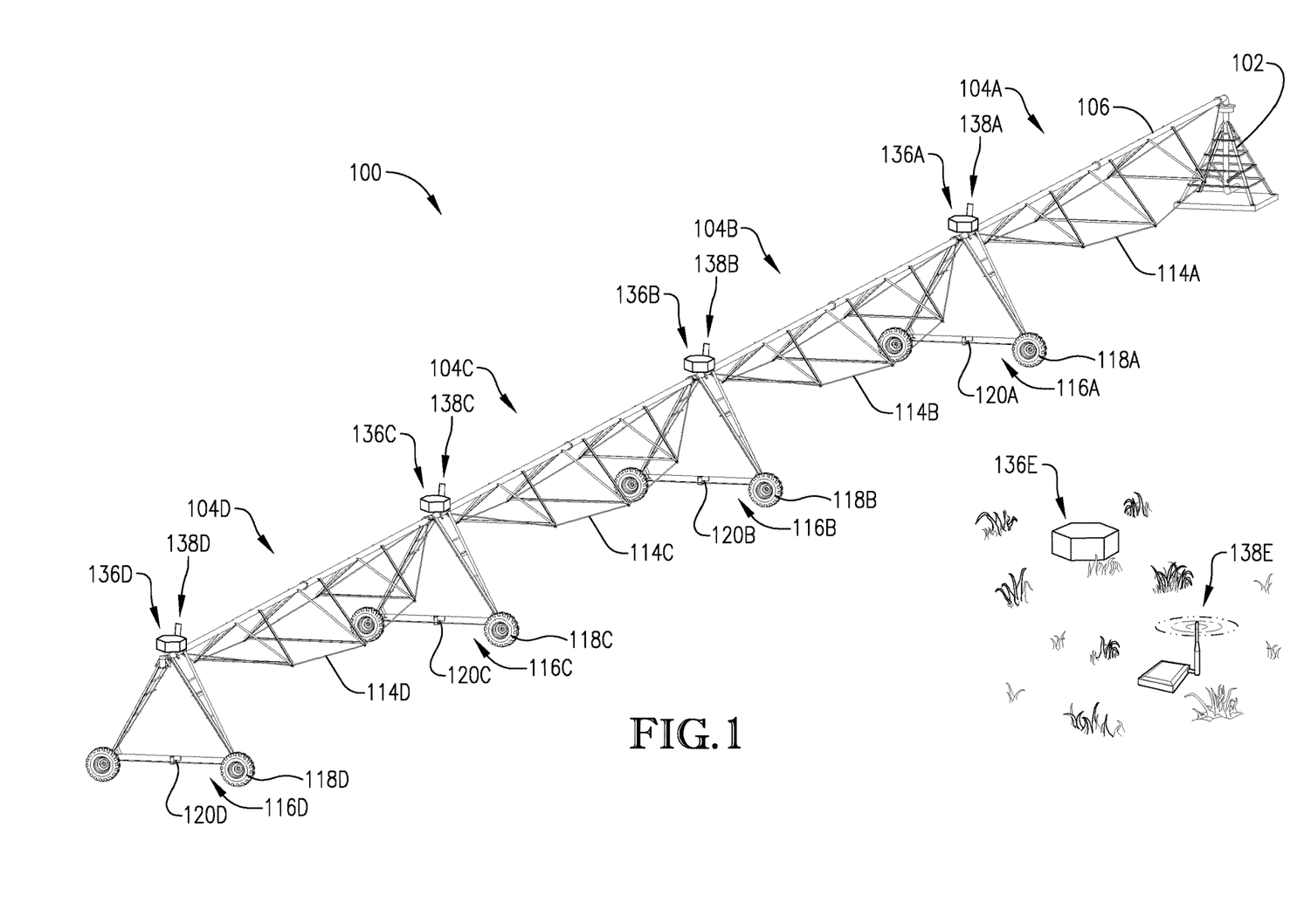
FIG. 1 is a perspective view of a mobile irrigation system including a pest deterrent system constructed in accordance with an embodiment of the invention.
Figure 2:
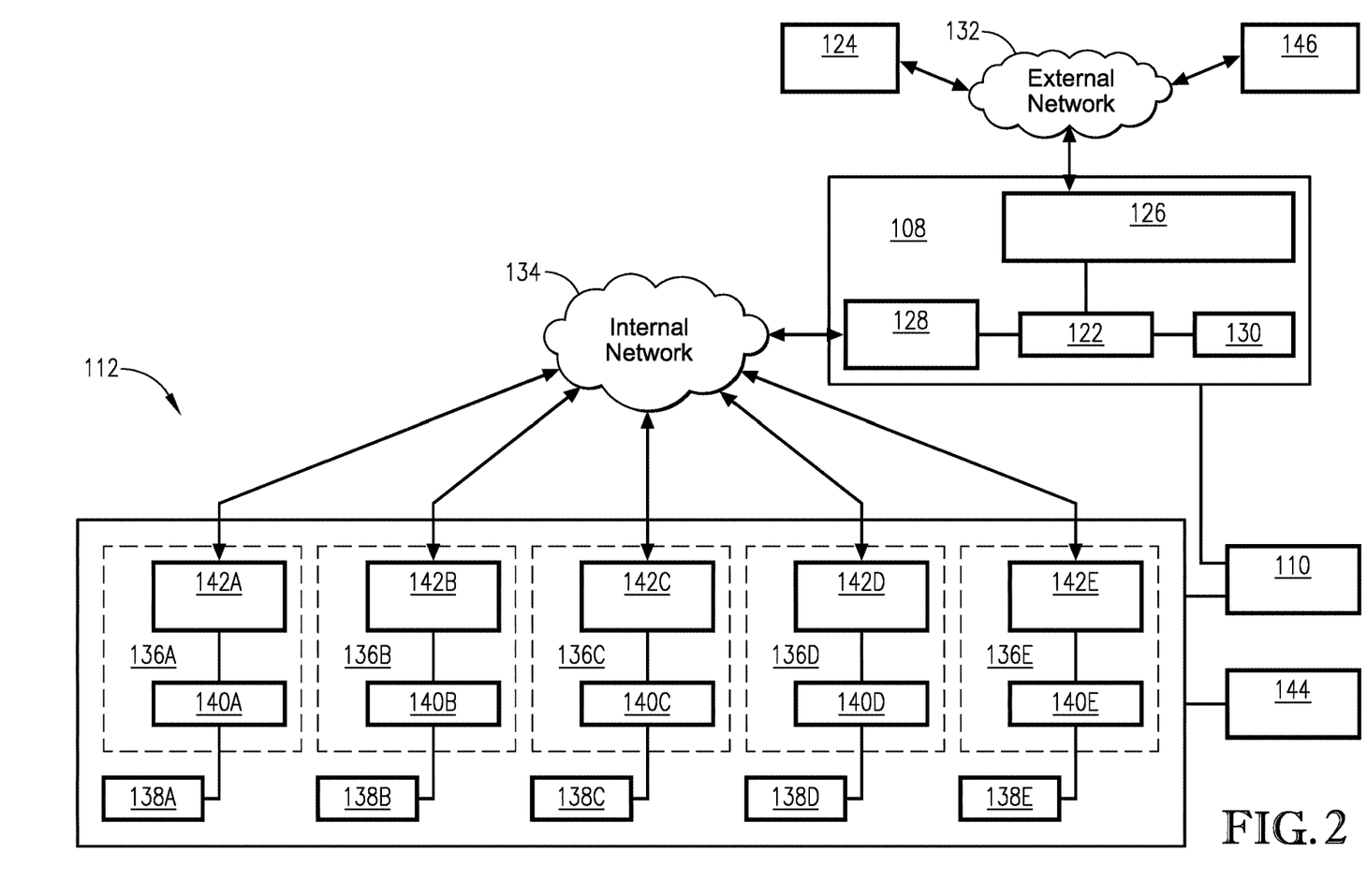
FIG. 2 is a schematic diagram of a control system and a pest deterrent system of the mobile irrigation system of FIG. 1.

Turning to the drawing figures, a mobile irrigation system 100 constructed in accordance with various embodiments of the invention is illustrated. The mobile irrigation system 100 includes an active pest deterrent system 112 that can be remotely controlled, changed, and updated via an external network connection.

The mobile irrigation system 100 broadly comprises a fixed central pivot 102, a plurality of spans 104A-D, a conduit 106, a control system 108, a power supply 110, and the aforementioned active pest deterrent system 112. Although a center pivot irrigation system is shown and described, lateral move irrigation systems and stationary irrigation systems may also be utilized.

The fixed central pivot 102 may be a tower or any other support structure about which the spans 104A-D pivot or rotate. The central pivot 102 has access to a well, water tank, or other source of water and may also be coupled with a tank or other source of agricultural products to inject fertilizers, pesticides and/or other chemicals into the water for application during irrigation. The central pivot 102 may supply water to the conduit 106.

Each span 104A-D includes a truss section 114A-D and a mobile tower 116A-D. The spans 104A-D are pivotably connected end-to-end from the central pivot 102.

Each truss section 114A-D includes a plurality of beams rigidly connected to one another to form a framework which carries or otherwise supports the conduit 106. The truss sections 114A-D are suspended above the ground between the mobile towers 116A-D.

The mobile towers 116A-D are positioned at outward ends of the spans 104A-D and each includes at least one wheel 118A-D driven by a drive motor 120A-D. Each drive motor 120A-D may be an electric motor, such as an alternating current (AC) motor or a direct current (DC) motor, and may drive the wheel or wheels 118A-D directly or through a drive shaft in order to propel the mobile towers 116A-D forward or backward. Each mobile tower 116A-D further includes a plurality of beams rigidly connected to one another to form a framework which couples the conduit 106 and the truss sections 114A-D to the wheels 118A-D and the drive motor 120A-D.

The conduit 106 carries water along the length of the spans 104A-D. The conduit 106 may include one or more valves which control the flow of water through the conduit 106 into fluid distribution mechanisms in fluid communication with the conduit 106. Fluid distribution mechanisms may include sprayers, diffusers, or diffusers, each optionally attached to a drop hose, or the like. The opening and closing of the valves may be automatically controlled with an electronic signal or digital data.

The control system 108 may include a controller 122, a user interface 124, a data transfer module 126, a first internal network communication element 128, and a memory 130. The controller 122 may comprise one or more processing units, microprocessors (single-core or multi-core), microcontrollers, digital signal processors (DSPs), field-programmable gate arrays (FPGAs), analog and/or digital application-specific integrated circuits (ASICs), or the like, or combinations thereof. The controller 122 may generally execute, process, or run instructions, code, code segments, code statements, software, firmware, programs, applications, apps, processes, services, daemons, or the like. The control system 108 may also include hardware components such as registers, finite-state machines, sequential and combinational logic, configurable logic blocks, and other electronic circuits that can perform the functions necessary for the operation of the current invention. In certain embodiments, the control system 108 may include multiple computational components and functional blocks that are packaged separately but function as a single unit. The control system 108 may be in electronic communication with other electronic components through serial or parallel links that include universal busses, address busses, data busses, control lines, and the like. The control system 108 may be a pre-existing control system having pre-existing computing hardware such that the active pest deterrent system 112 is integrated with the pre-existing computing hardware. For example, software utilized by the active pest deterrent system 112 may be installed on the pre-existing computing hardware of the pre-existing control system.

The user interface 124 generally allows a user to at least one of program, activate, and directly control the mobile irrigation system 100 and/or the active pest deterrent system 112, and to control features, functions, and operation of the mobile irrigation system 100 and/or the active pest deterrent system 112. The user interface 124 may be retained in a housing located at, or near the center pivot or one of the mobile towers 116A-D, or may be incorporated in a remote computing device such as a mobile phone, tablet, laptop, or the like. In this way, changes and updates to the pest deterrent system 112 may be made via a remote user or a local user. Inputs may include a touchscreen, buttons, pushbuttons, knobs, jog dials, shuttle dials, directional pads, multidirectional buttons, switches, keypads, keyboards, mice, joysticks, microphones, or the like, or combinations thereof. Additionally, or alternatively, the user interface 124 may include a software interface that is implemented in a mobile electronic device application, a desktop or laptop computer application, a website application, or the like.

The data transfer module 126 generally allows the control system 108, and the active pest deterrent system 112 indirectly, to communicate with, transfer data (including agricultural data) to, and download software updates, programming, and direct commands from an external system 146, which may be a remote server, remote or mobile computing device (such as one utilized by a remote user), cloud service, or other external system, and/or each other via an external network 132. The data transfer module 126 may include signal and/or data transmitting and receiving circuits, such as antennas, amplifiers, filters, mixers, oscillators, digital signal processors (DSPs), and the like.

The external network 132 may be a wireless communication network utilizing radio frequency (RF) signals and/or communication standards such as cellular 2G, 3G, 4G, Voice over Internet Protocol (VoIP), LTE, Voice over LTE (VoLTE), or 5G, Institute of Electrical and Electronics Engineers (IEEE) 802.11 standard such as WiFi, IEEE 802.16 standard such as WiMAX, Bluetooth™, or combinations thereof. In addition, the external network 132 may utilize communication standards such as ANT, ANT+, Bluetooth™ low energy (BLE), the industrial, scientific, and medical (ISM) band at 2.4 gigahertz (GHz), or the like. The external network 132 may be or may implement characteristics of a machine to machine (M2M) network, an edge network, a LAN, a WAN, or the like.

The first internal network communication element 128 communicates with the controllers of the pest deterrent devices described below over an internal mobile irrigation system network 134. The internal mobile irrigation system network 134 may be a LAN, a wireless mesh, or the like. The internal mobile irrigation system network 134 may utilize a VPN and may utilize the same networking hardware as the external network 132. The first internal network communication element 128 may be a radio antenna, Wi-Fi antenna, or the like in the case of a wireless network.

The internal mobile irrigation system network 134 may be a wired or wireless communication network utilizing radio frequency (RF) signals and/or communication standards such as cellular 2G, 3G, 4G, Voice over Internet Protocol (VoIP), LTE, Voice over LTE (VoLTE), or 5G, Institute of Electrical and Electronics Engineers (IEEE) 802.11 standard such as WiFi, IEEE 802.16 standard such as WiMAX, Bluetooth™, or combinations thereof. In addition, the internal mobile irrigation system network 134 may utilize communication standards such as ANT, ANT+, Bluetooth™ low energy (BLE), the industrial, scientific, and medical (ISM) band at 2.4 gigahertz (GHz), or the like. The internal mobile irrigation system network 134 may be or may implement characteristics of a machine to machine (M2M) network, an edge network, a LAN, a WAN, or the like.

The memory 130 may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory 130 may be embedded in, or packaged in the same package as, the control system 108. The memory 130 may include, or may constitute, a non-transitory "computer-readable medium". The memory 130 may store the instructions, code, code statements, code segments, software, firmware, programs, applications, apps, services, daemons, or the like that are executed by the control system 108. The memory 130 may also store data that is received by the control system 108, the device in which the control system 108 is implemented, and/or the active pest deterrent system 112. The control system 108 may further store data or intermediate results generated during processing, calculations, and/or computations as well as data or final results after processing, calculations, and/or computations. In addition, the memory 130 may store settings, data, documents, sound files, photographs, videos, images, databases, and the like.

The power source 110 provides electrical power to the motors 120, the control system 108, and/or the active pest deterrent system 112. The power source 110 may be an electrical charging system connected to the grid or an independent wind or solar powered unit.

The active pest deterrent system 112 deters pests from entering or remaining in the field and comprises a plurality of pest deterrent devices 136A-E, a plurality of sensors 138A-E, and a secondary power source 144. The active pest deterrent system 112 may be customized according to a size and/or type of mobile irrigation system 100, a size, shape, and/or terrain of the field and surrounding areas and environment, a type of crop being grown, a type of pest expected, and other factors.

Each pest deterrent device 136A-E my be substantially similar and thus only pest deterrent device 136A will be described in detail. Pest deterrent device 136A is configured to deter pests in its vicinity and may include a controller 140A and a second internal network communication element 142A. The pest deterrent device 136A may be mounted at various points on the mobile irrigation system 100. For example, pest deterrent device 136A may be mounted on the first mobile tower 116A. Each pest deterrent device 136A-E may be centrally controlled via the control system 108 or may be an independently controlled node or even completely independent from the other pest deterrent devices. The pest deterrent devices 136A-E may also use another network (e.g., a wireless mesh) unique from the internal network of the mobile irrigation system 100.

The controller 140A activates the pest deterrent device 136A and may include one or more processing units, microprocessors (single-core or multi-core), microcontrollers, digital signal processors (DSPs), field-programmable gate arrays (FPGAs), analog and/or digital application-specific integrated circuits (ASICs), or the like, or combinations thereof. The controller 140A may generally execute, process, or run instructions, code, code segments, code statements, software, firmware, programs, applications, apps, processes, services, daemons, or the like. The controller 140A may generally execute, process, or run instructions, code, code segments, code statements, software, firmware, programs, applications, apps, processes, services, daemons, or the like. The controller 140A may also include hardware components such as registers, finite-state machines, sequential and combinational logic, configurable logic blocks, and other electronic circuits that can perform the functions necessary for the operation of the current invention.

The second internal network communication element 142A communicates with the controller 122 of the control system 108 over the internal mobile irrigation system network 134 via the first internal network communication element 128. The second internal network communication element 142A may be a radio antenna, Wi-Fi antenna, or the like in the case of a wireless network.

The sensors 138A-E may be substantially similar to each other and thus only sensor 138A will be described in detail. Sensor 138A detects the presence of a pest and may be mounted at various points on the mobile irrigation system 100. In one embodiment, the sensor 138A is mounted near or integrated with pest deterrent device 136A. In another embodiment, the sensor 138A is mounted or positioned remotely from the pest deterrent device 136A either on the mobile irrigation system 100 or in the field in the vicinity of the mobile irrigation system 100. This may be particularly useful in cases where the sensor 138A has an effective range different than an effective range of the pest deterrent device 136A. It also allows the pest deterrent device 136A to be activated as a pest enters the field. Similarly, the sensor 138A may be more effective near the ground whereas the pest deterrent device 136A may be more effective at an elevated vantage point and vice versa.

Sensors 138A-E are shown paired with corresponding pest deterrent devices 136A-E. In another embodiment, the sensors 138A-E may collectively serve the pest deterrent devices 136A-E according to a pest deterrent scheme. For example, sensor 138A may trigger pest deterrent device 138E depending on a pest type, a zone in which the pest was detected, or other factors. In other embodiments, remote sensors such as satellite imaging systems that can provide sub-meter satellite imagery may be used to detect the presence of a pest.

The secondary power source 144 may be configured to provide electrical power to the pest deterrent devices 136A-E when electrical power is not available or needed from the power source 110. The secondary power source 144 may be a battery, a power scavenging device, or a power harvesting device such as a solar panel or a wind turbine.

Some of the pest deterrent devices such as pest deterrent device 136E may be positioned in the field near or remote from the mobile irrigation system 100. Furthermore, some of the pest deterrent devices 136A-E may be integrated with an unmanned aerial vehicle (UAV or drone) or rover configured to be dispatched from the mobile irrigation system 100 or a base near the mobile irrigation system 100.

Each of the pest deterrent devices 136A-E may be a laser, a noise cannon, an animal distress call sound generator, an ultrasonic noise generator, a subsonic noise generator, a strobe light, or any other suitable pest deterrent device. The pest deterrent devices 136A-E may include at least two of the above pest deterrent devices for diversified pest deterrence. For example, the pest deterrent devices 136A-E may include a noise cannon for repelling animals that respond to noise disturbances and a strobe light for repelling animals that respond to light disturbances. Lasers may be particularly suitable for repelling birds. Noise cannons may be particularly suitable for repelling birds such as turkeys and mammals such as deer and racoons. Bird distress calls may be played through speakers to repel other birds. Ultrasonic and sub-sonic pulse wave generators may be used to repel birds and small rodents.

In use, the active pest deterrent system 112 may deter pests according to a pest deterrent scheme, which may be active independent of movement or irrigation of the mobile irrigation system or may be dependent upon a movement or irrigation scheme of the mobile irrigation system. The pest deterrent devices 136A-E themselves may be activated upon receiving a signal from one of the sensors 138A-E indicating the presence of a pest.

The pest deterrent devices 136A-E may be programmed for changes, adjustments, and/or updates to the pest deterrent scheme. Changes or adjustments may be made to various aspects of pest deterrent schemes such as laser patterns, noise cannon trajectory, projected noise pattern, deterrent timing, volume, delays, bird distress calls, and the like. For example, distress calls of different birds may be used as different birds enter the field or as different migrations are active. Such programming can be achieved remotely via the external network 132.

Pest deterrent schemes, patterns of pest deterrent schemes, and other parameters may include changes or be changed to keep pests reactive to the deterrent. For example, a changing pest deterrent scheme may re-trigger a fight or flight response from a pest. It also facilitates a single pest deterrent device 136A-E being effective against different pests or types of pests.

Changes, adjustments, and/or updates may be stored locally on the control system 108 and pushed to the pest deterrent devices 136A-E over the internal mobile irrigation system network 134, stored in the cloud and pushed to the pest deterrent devices 136A-E through the external network 132 and the internal mobile irrigation system network 134, defined by a remote user and pushed to the pest deterrent devices 136A-E through the external network 132 and the internal mobile irrigation system network 134, and/or defined by a local user and pushed to the pest deterrent devices 136A-E via the internal mobile irrigation system network 134.

The above-described mobile irrigation system 100 and active pest deterrent system 112 provide several advantages in addition to the advantages described above. For example, the pest deterrent devices 136A-E may be programmed for changes, adjustments, and/or updates to the pest deterrent scheme. Changes or adjustments may be made to various aspects of pest deterrent schemes. Such programming can be achieved remotely via the external network 132. Pest deterrent schemes, patterns of pest deterrent schemes, and other parameters may include changes or be changed to keep pests reactive to the deterrent. The active pest deterrent system 112 provides pest protection to the field and crops irrigated by the mobile irrigation system 100. The active pest deterrent system 100 may also provide pest protection to the mobile irrigation system 100 itself and to other equipment in the field.

Furthermore, at least some of the pest deterrent devices 136A-E may be mounted well above the crops, such as on the trusses 114A-D or mobile towers 116A-D to deploy the deterrent without having to add additional structures to the field. This also allows crops to be harvested without having to remove the pest deterrent devices 136A-E from the field. The pest active pest deterrent system 112 may be particularly useful for high value-added crops such as sweet corn, seed corn, potatoes, sugar beets, mint, sunflowers, and other crops.

ADDITIONAL CONSIDERATIONS

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Patent claims stemming from this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in any claims stemming from this application.

Having thus described various embodiments of the technology, patentable subject matter may include the following.

The invention claimed is:

1. A mobile irrigation system comprising:
   a plurality of irrigation spans each including a mobile tower having:
      a wheel assembly for traversing a field; and
      a motor configured to drive the wheel assembly;
   a control system for controlling the motors of the mobile towers, the control system including:
      a data transfer module configured to transmit communication signals over an external network; and
      a first internal network communication element configured to transmit communication signals over an internal mobile irrigation system network; and
   an active pest deterrent system at least partially mounted to one of the plurality of irrigation spans, the active pest deterrent system including a pest deterrent device configured to deter pests from remaining in the field or near the mobile irrigation system, the pest deterrent device including:
      a controller configured to activate the pest deterrent device; and
      a second internal network communication element communicatively coupling the controller to the control system via the internal mobile irrigation system network.

2. The mobile irrigation system of claim 1, the controller being configured to receive pest deterrent programming updates over the internal mobile irrigation system network via the second internal network communication element.

3. The mobile irrigation system of claim 2, the control system being configured to push the pest deterrent programming updates to the controller over the internal mobile irrigation system network.

4. The mobile irrigation system of claim 3, the control system further comprising a memory configured to store the pest deterrent programming updates, the control system being configured to push the pest deterrent programming updates to the controller over the internal mobile irrigation system network from the memory.

5. The mobile irrigation system of claim 2, the pest deterrent programming updates being at least one of changes to a laser pattern, changes to a direction of a noise cannon changes to a timing of a pest deterrent, changes to a volume or intensity of a deterrent, changes to a delay of a pest deterrent, and changes to a type of animal distress call.

6. The mobile irrigation system of claim 2, the pest deterrent programming updates being defined by remote user inputs.

7. The mobile irrigation system of claim 1, the control system being configured to communicate with external computing devices over an external network via a machine to machine (M2M) connection, the controller being configured to indirectly communicate with the external computing devices via the control system.

8. The mobile irrigation system of claim 1, further comprising a pre-existing control system, the active pest deterrent system being configured to integrate with the pre-existing control system.

9. The mobile irrigation system of claim 1, the active pest deterrent system further including a secondary power source including at least one of a battery, a solar panel, and a wind turbine.

10. The mobile irrigation system of claim 1, the active pest deterrent system further including a sensor configured to detect the presence of a pest.

11. The mobile irrigation system of claim 10, the sensor being configured to be mounted on the mobile irrigation system remotely from the pest deterrent device.

12. The mobile irrigation system of claim 1, at least a portion of the active pest deterrent system being positioned in the field remotely from the plurality of irrigation spans.

13. The mobile irrigation system of claim 12, the at least a portion of the active pest deterrent system positioned in the field remotely being communicatively coupled with the control system over the internal mobile irrigation system network for receiving pest deterrent programming updates.

14. The mobile irrigation system of claim 1, the pest deterrent device being at least one of a laser, a noise cannon, an animal distress call sound generator, an ultrasonic noise generator, a subsonic noise generator, and a strobe light.

15. A mobile irrigation system comprising:
a plurality of irrigation spans each including:
a conduit section connected to conduit sections of adjacent irrigation spans for transporting an irrigation fluid from a fluid source to a field;
a truss configured to support the conduit section;
a plurality of fluid emitters connected to the conduit section for delivering the irrigation fluid to crops in the field; and
a mobile tower connected to the truss and configured to move the truss, conduit section, and fluid emitters across the field, the mobile tower including:
a wheel assembly for traversing the field; and
a motor configured to drive the wheel assembly;
a control system for controlling the motors of the mobile towers, the control system including:
a data transfer module configured to transmit communication signals over an external network via a machine to machine (M2M) connection; and
a first internal network communication element configured to transmit communication signals over an internal mobile irrigation system network; and
an active pest deterrent system at least partially mounted to one of the trusses or mobile towers, the active pest deterrent system including:
a pest deterrent device configured to deter pests from remaining in the field or near the mobile irrigation system, the pest deterrent device including:
a controller configured to activate the pest deterrent device; and
a second internal network communication element communicatively coupling the controller to the control system via the internal mobile irrigation system network,
the controller being configured to:
receive pest deterrent programming updates defined by remote user inputs over the internal mobile irrigation system network via the second internal network communication element; and
indirectly receive pest deterrent programming updates from external computing devices via the M2M connection.

16. The mobile irrigation system of claim 15, the control system further comprising a memory configured to store the pest deterrent programming updates, the control system being configured to push the pest deterrent programming updates to the controller over the internal mobile irrigation system network from the memory.

17. The mobile irrigation system of claim 15, at least a portion of the active pest deterrent system being positioned in the field remotely from the mobile tower and truss.

18. The mobile irrigation system of claim 17, the at least a portion of the active pest deterrent system positioned in the field remotely being communicatively coupled with the control system over the internal mobile irrigation system network for receiving pest deterrent programming updates.

19. A mobile irrigation system comprising:
a plurality of irrigation spans each including:
a conduit section connected to conduit sections of adjacent irrigation spans for transporting an irrigation fluid from a fluid source to a field;
a truss configured to support the conduit section;
a plurality of fluid emitters connected to the conduit section for delivering the irrigation fluid to crops in the field; and
a mobile tower connected to the truss and configured to move the truss, conduit section, and fluid emitters across the field, the mobile tower including:
a wheel assembly for traversing the field; and
a motor configured to drive the wheel assembly;
a control system for controlling the motors of the mobile towers, the control system including:
a data transfer module configured to transmit communication signals over an external network via a machine to machine (M2M) connection; and
a first internal network communication element configured to transmit communication signals over an internal mobile irrigation system network; and
an active pest deterrent system at least partially mounted to one of the trusses or mobile towers, the active pest deterrent system including:
a plurality of pest deterrent devices configured to deter pests from remaining in the field or near the mobile irrigation system, each of the pest deterrent devices including:
a controller configured to activate the pest deterrent device; and
a second internal network communication element communicatively coupling the controller to the control system via the internal mobile irrigation system network,
the controller being configured to:
receive pest deterrent programming updates defined by remote user inputs over the internal mobile irrigation system network via the second internal network communication element; and
indirectly receive pest deterrent programming updates from external computing devices via the M2M connection; and
a plurality of sensors communicatively coupled with the pest deterrent devices and configured to detect a presence of a pest,
wherein some of the plurality of pest deterrent devices and sensors are mounted on the irrigation spans of the mobile irrigation system and some of the plurality of pest deterrent devices and sensors are positioned in the field.

* * * * *